SAIGER & DAVIS.
Fruit-Gatherer.
No 60,561.                                    Patented Dec. 18, 1866.
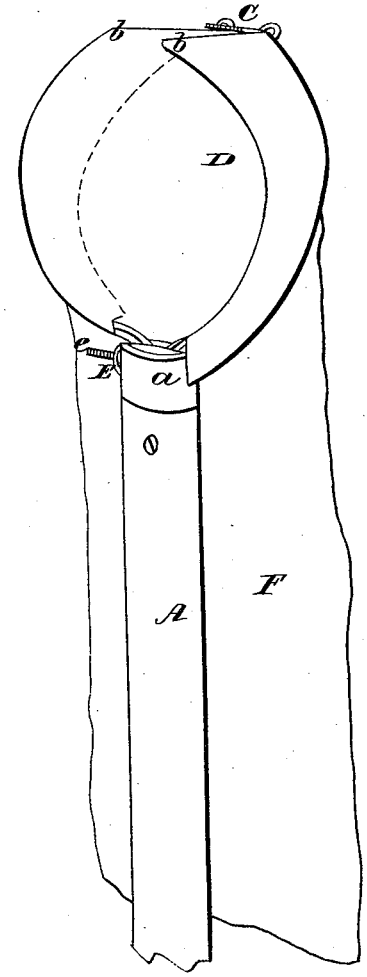
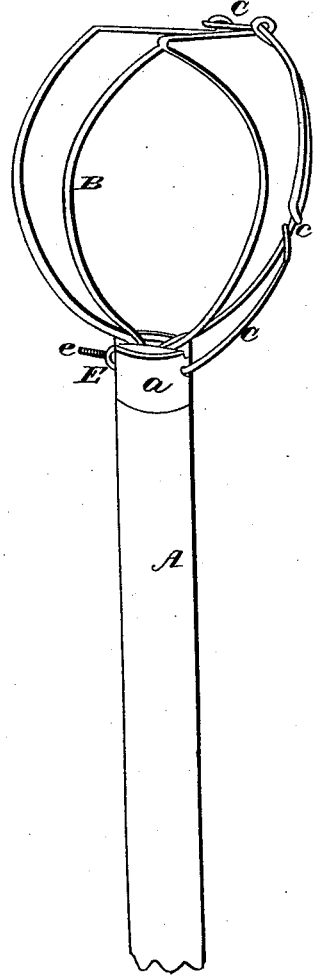
Witnesses                                     Inventors

United States Patent Office.

IMPROVEMENT IN FRUIT PICKER.

J. F. SAIGER AND ABRAHAM DAVIS, OF SHELBY, OHIO.

Letters Patent No. 60,561, dated December 18, 1866.

The Schedule referred to in these Letters Patent and making part of the same.

TO ALL WHOM IT MAY CONCERN:

Be it known that we, J. F. SAIGER and A. DAVIS, of Shelby, in the county of Richland, and State of Ohio, have invented certain new and useful improvements in Fruit Pickers; and we do hereby declare that the following is a full and complete description of the same, reference being had to the accompanying drawings, making a part of this specification, in which—

Figure 1 is a perspective view of the picker.

Figure 2 is a perspective view of the same, with the bag removed.

Like letters of reference refer to like parts in the views.

In the drawings, A represents the handle, to which is secured the skeleton spring head B. This head is composed of wires, which are bent in the form of a circle, as shown in fig. 2, which, when covered with cloth or other suitable material, forms the hood D, fig. 1; the ends of the wires being secured in the handle A, referred to, there being a mortise in the end of the handle to receive them. $a$ is a plate surrounding the end of the handle. At the upper part of the head B the wires form jaws, $b$, which are drawn nearer to or further from each other, according to the size of the fruit to be gathered. This is done by means of the tension-rod C, which rod is secured to the jaws $b$ in the manner shown in fig. 2, extends down, and is coiled round the wire, which forms part of the head at $c$, then passes down and extends through the upper part of the handle A. On the end, $e$, of this rod is the adjustable screw-nut E. When small fruit is to be gathered, the jaws, $b$, are drawn close together by means of the screw-nut E and tension-rod C, as stated; or, when larger fruit, the jaws can be moved apart in the same way, according to the size of the fruit to be gathered. When the fruit is picked it will fall into the bag F, and pass from that to the hand of the person using the pickers or to a basket below.

What we claim as our improvement, and desire to secure by Letters Patent, is—

The skeleton spring head B, tension-rod C, and adjustable screw-nut E, in combination with the hood D, bag F, and handle A, when arranged in the manner and for the purpose described.

J. F. SAIGER,
ABRAHAM DAVIS.

Witnesses:
W. H. BURRIDGE,
S S. BLOOM.